(12) United States Patent
Yuan

(10) Patent No.: US 7,917,541 B2
(45) Date of Patent: Mar. 29, 2011

(54) COLLECTING AND AGGREGATING DATA USING DISTRIBUTED RESOURCES

(75) Inventor: Zhongsheng Yuan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 12/058,789

(22) Filed: Mar. 31, 2008

(65) Prior Publication Data

US 2009/0248712 A1 Oct. 1, 2009

(51) Int. Cl.
*G06F 17/30* (2006.01)
(52) U.S. Cl. .................................................. 707/802
(58) Field of Classification Search .............. 707/2, 100, 707/802; 702/186
See application file for complete search history.

(56) References Cited

U.S. PATENT DOCUMENTS

| 6,408,292 | B1 | 6/2002 | Bakalash et al. |
| 6,411,961 | B1 | 6/2002 | Chen |
| 6,587,857 | B1 | 7/2003 | Carothers et al. |
| 7,007,020 | B1 | 2/2006 | Chen et al. |
| 7,231,403 | B1 | 6/2007 | Howitt et al. |
| 7,254,640 | B2 | 8/2007 | Alexander |
| 7,412,352 | B1 * | 8/2008 | Fagerstrom .................... 702/186 |
| 2005/0027721 | A1 | 2/2005 | Saenz |
| 2007/0027843 | A1 | 2/2007 | Auerbach et al. |
| 2007/0174236 | A1 | 7/2007 | Pagnussat et al. |

FOREIGN PATENT DOCUMENTS

WO 2005076160 A1 8/2005

OTHER PUBLICATIONS

Ganti, et al., "DEMON: Mining and Monitoring Evolving Data," IEEE Transactions on Knowledge and Data Engineering, vol. 13, No. 1, Jan./Feb. 2001, pp. 50-63.
Kerschberg, "Knowledge Management in Heterogeneous Data Warehouse Environments," Lecture Notes In Computer Science, vol. 2114, 2001, pp. 1-10.
Anand, et al.; "Data Warehouse Architecture for DSS Applications," Australian Journal of Information Systems, Sep. 1996; vol. 4, No. 1, pp. 43-53.

* cited by examiner

*Primary Examiner* — Etienne P LeRoux

(57) ABSTRACT

A hierarchial tree is provided to harvest data from data sources. The hierarchial tree includes multiple tree node entities arranged in multiple levels. In one case, leaf node entities of the hierarchial tree are used to collect data from the data sources. The hierarchial tree includes storage resources for storing the collected data. The hierarchial tree further includes computing resources for aggregating the collecting data in one or more aggregation operations and performing other processing operations. A receiving entity can selectively and independently receive parts of the collected data and aggregated data.

12 Claims, 14 Drawing Sheets

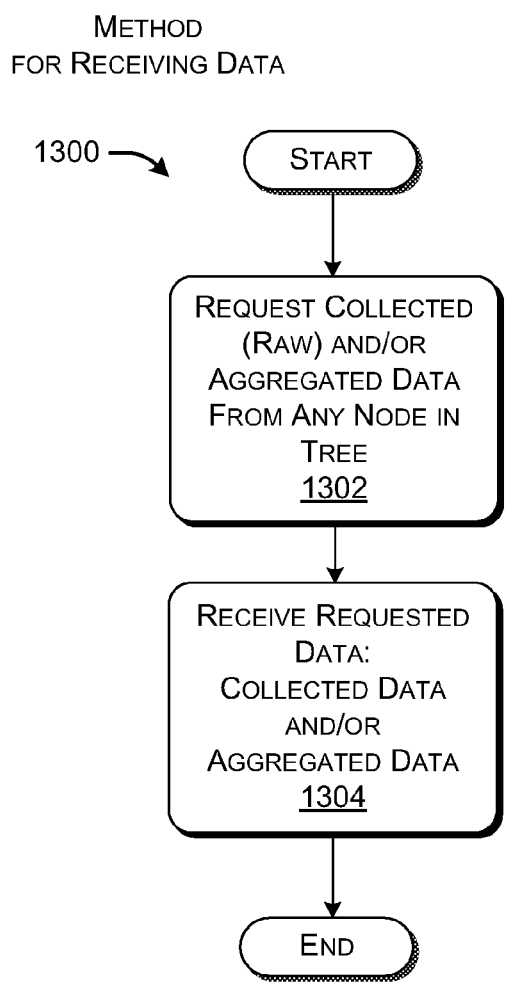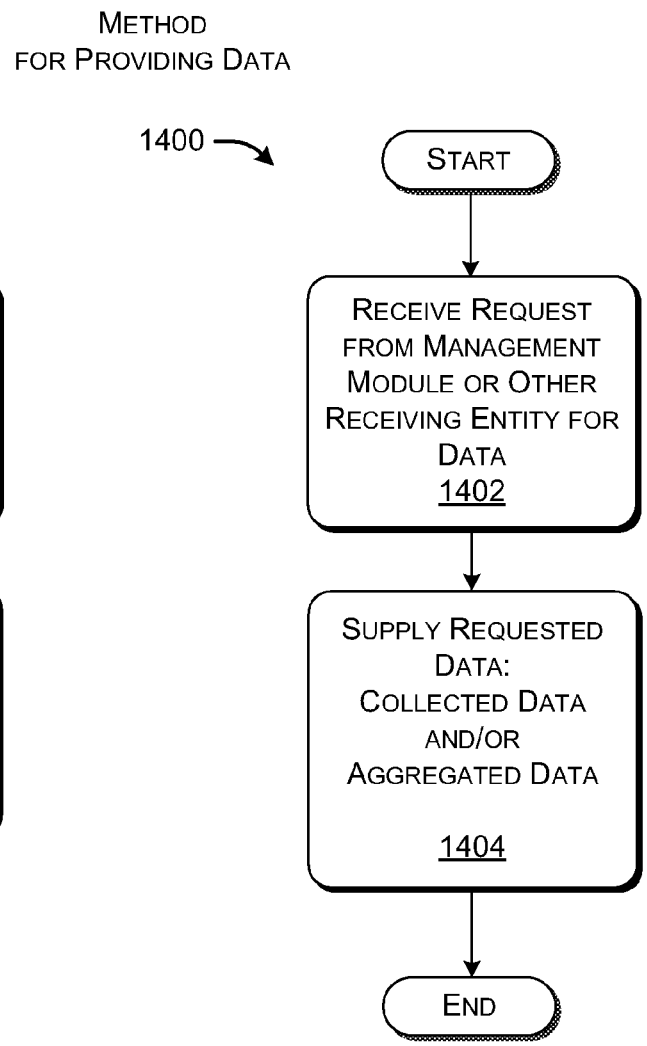
FIG. 13
FIG. 14

COLLECTING AND AGGREGATING DATA USING DISTRIBUTED RESOURCES

BACKGROUND

Data warehousing technology collects and processes data from a group of data sources. For instance, a business-related organization may use data warehousing technology to harvest transactional information from a group of systems throughout the organization. Administrators of the organization may use the collected data to generate various reports. In one use, the reports provide insight into the operation of the organization.

In a typical data warehousing operation, raw data from a group of data sources is forwarded to a centralized collection point using client-server interaction. A series of processing stations then process the collected data. In other words, the traditional approach funnels a large amount of collected data into a processing pipeline; within the pipeline, each station performs operations on the data in successive fashion (such as various types of transformation operations). The data warehousing technology also aggregates the collected data to yield aggregated results. These operations may result in the storage of a large amount of data. After the above-described operations have been performed, and not before, a user may generate reports based on the aggregated results or the raw collected data (or both).

The above approach continues to work well in many environments. However, some environments include data sources which generate an enormous amount of data. One example of such an environment is a network-accessible service that includes a group of computer servers, network devices, etc. that generate performance data, log data, and other information. For instance, each such device may make several performance measurements each second. Further, a large-scale operation may provide many thousands of devices. As can be appreciated, this type of operation generates a significant amount data.

In these environments, the traditional approach may experience bottlenecks in transporting, processing, and storing the large amount of data. As a result, it is a time-consuming task for the traditional approach to process the collected data. As a further consequence, an administrator may need to wait a significant amount of time before he or she can investigate the state of computer servers that are being monitored—potentially more than an hour. This renders any reports available through this technology untimely, and thus of questionable use.

The above-described approach may have one or more additional drawbacks. The approach may be relatively complex and expensive. The approach may also be relatively inflexible and not readily scalable. The approach may also provide only a small subset of the data provided by the data source (due to its difficulty in processing such a large amount of data). The approach may also provide poor (e.g., unpredictable) performance. Further, the approach may provide insufficient tools for allowing a user to investigate the data processing equipment being monitored. The traditional approach may have yet additional drawbacks.

SUMMARY

In one illustrative implementation, a hierarchical tree is provided to expeditiously harvest data from data sources in any environment. The hierarchical tree includes multiple tree node entities arranged in multiple levels. In one case, a leaf level of the hierarchical tree includes leaf node entities that collect data from the data sources. The hierarchical tree includes storage resources for storing the collected data provided by the leaf node entities. The hierarchical tree further includes computing resources for aggregating the collected data in one or more aggregation operations to yield aggregated data. The storage resources and the computing resources together form distributed resources provided by the hierarchical tree. A receiving entity can selectively receive parts of the collected data and aggregated data from the hierarchical tree.

According to one illustrative feature, collected data and aggregated data is made available to the receiving entity substantially contemporaneously with the collection of the data at the leaf node entities.

According to another illustrative feature, the collected data is made available to the receiving entity independently of the aggregated data.

According to another illustrative feature, at least some of tree node entities perform respective principal functions unrelated to the tasks of data collection and processing. The storage resources and computing resources of the hierarchical tree correspond to spare resources that are not being utilized by the principal functions.

According to another illustrative feature, at least the leaf node entities may correspond to production devices that deliver a network-accessible service. According to another illustrative feature, all of the tree node entities may correspond to such production devices.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 13 is a flowchart that shows an illustrative way to request data from any tree node entity.

FIG. 14 is a flowchart (that complements the flowchart of FIG. 13) that shows an illustrative way to provide requested data from any tree node entity.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure describes an approach for performing a data warehousing operation or other type of data processing operation using a hierarchical tree of tree node entities. The hierarchical tree provides storage resource to store collected data. Further, the hierarchical tree provides computing resources to aggregate the collected data in one or more aggregation operations and to perform other data processing operations. The storage resources and the computing resources together form distributed resources provided by the hierarchical tree. The hierarchical tree enables a receiving entity to selectively obtain collected data soon after it has been collected. The hierarchical tree also decouples the collected data from the aggregated data, enabling the user to receive one type of data without the other.

The hierarchical tree can be applied to any environment. It is particularly well suited to data processing environments that include production devices that generate a large amount of data in the course of their use, but is not limited thereto. More generally, the concepts disclosed herein may address one or more of the challenges or problems previously noted, but are not limited to addressing all or any of these challenges or problems.

The above-described approach can be implemented using various systems, modules, data structures, machine-readable instructions, or other types of implementations.

This disclosure is organized as follows. Section A describes illustrative systems that make use of a hierarchical tree of tree node entities. Section B describes illustrative methods for providing data using the hierarchical tree. Section C describes illustrative processing functionality that can be used to implement any aspect of the features described in Sections A and B.

A. Illustrative Systems

Figure 15:
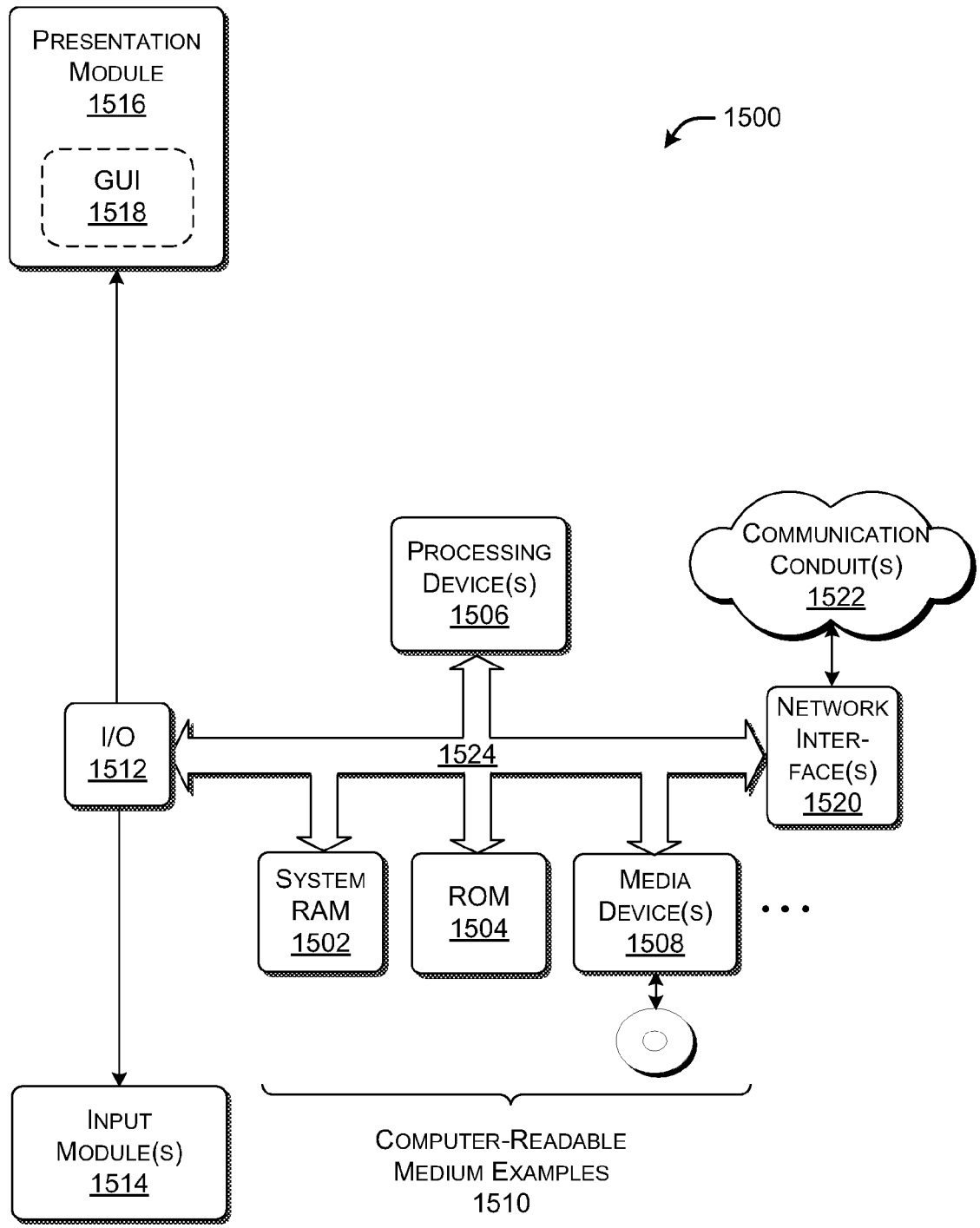
FIG. 15 shows illustrative processing functionality that can be used to implement any aspect of the features shown in the foregoing drawings.

As a preliminary matter, the various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, the depiction of any two or more separate components in the figures may reflect different functions performed by a single physical component. FIG. 15, to be discussed in turn, provides additional details regarding one illustrative implementation of the functions shown in the figures.

The term "data" is used herein as an abstract noun (e.g., as in "information"), and is referred to in the singular. In those instances in which it becomes appropriate to identify a particular element of data, the term "data item" is used.

A.1. Overview of a Representative Hierarchical Tree

Figure 1:
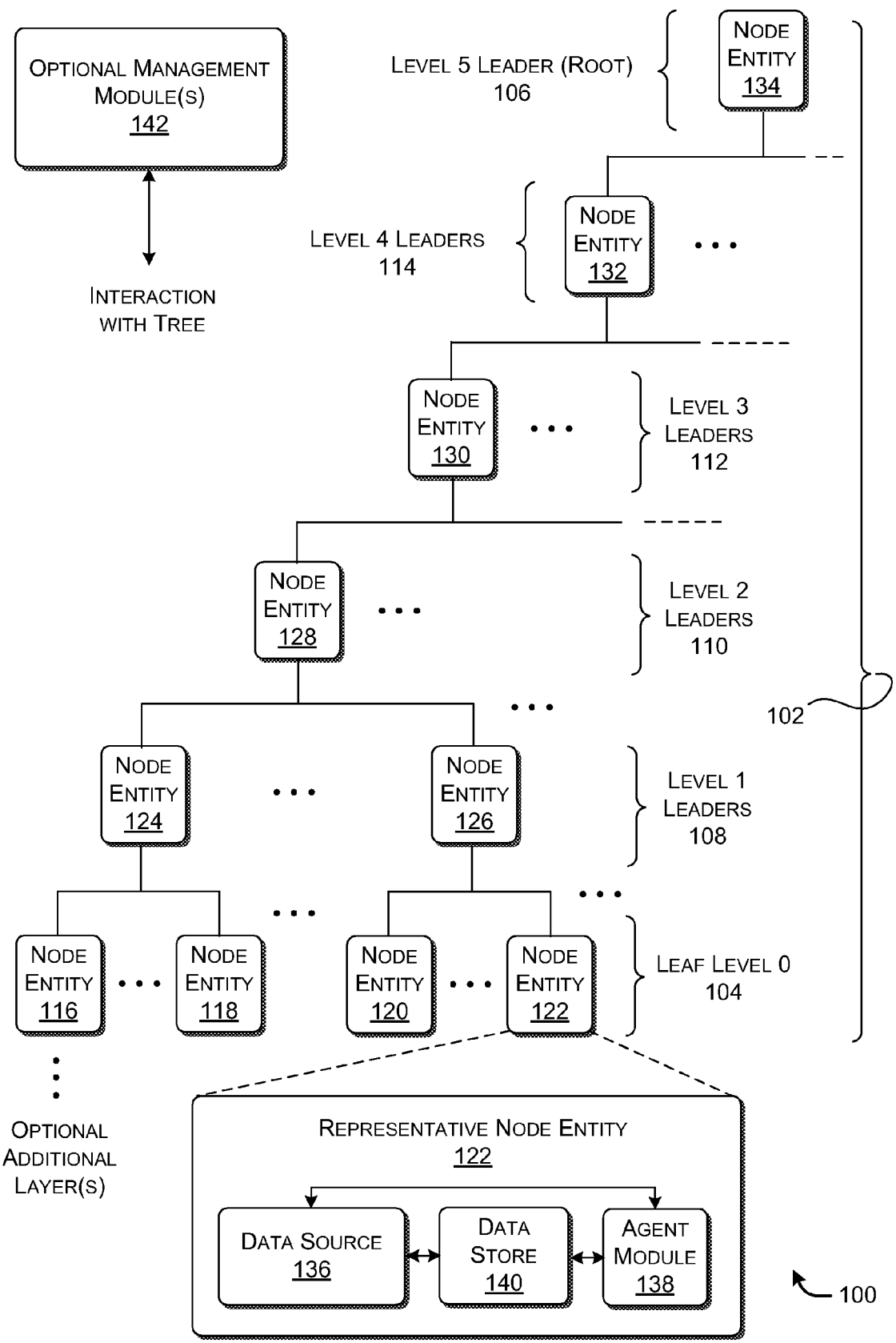
FIG. 1 shows a representative hierarchical tree for providing data from a collection of data sources.

FIG. 1 shows a system 100 that includes a hierarchical tree 102. The hierarchical tree 102 includes a plurality of levels. The implementation shown in FIG. 1 includes six levels, including a leaf node level 104, a root node level 106, and a series of intermediary levels (108, 110, 112, 114). The use of six levels is merely an example. Other implementations can include more than six levels or less than six levels.

The hierarchical tree 102 includes a plurality of representative tree node entities (116-134). As indicated by the numerous "..." symbols, FIG. 1 only shows a small sampling of the complete hierarchical tree 102, and thus shows only a small subset of the node entities that populate the hierarchical tree 102. The tree node entities (116-134) are referred to as simply "node entities" for brevity below.

The node entities (116-134) are arranged within the hierarchical tree 102 using the above-mentioned levels (104-114). In other words, the node entities (116-134) are logically linked together via a collection of parent-child relationships. For example, in the leaf level 104, representative node entity 116 and node entity 118 are linked to leader (or parent) node entity 124. Representative node entity 120 and node entity 122 are linked to leader (or parent) node entity 126. In the next level 108, the node entity 124 and node entity 126 are linked to leader node entity 128, and so on. The "topmost" node entity of the hierarchical tree 102 is a root node entity 134.

The node entities (116-134) can correspond to any type of data processing equipment, as well as to any combination of different types of data processing equipment. The data processing equipment can include, but is not limited to, various kinds of server-type computers, network devices, desktop computers, laptop computers, mobile telephone devices, set-top boxes, game console devices, personal digital assistants (PDAs), and so on.

More specifically, the node entities (116-134) are virtual entities associated with the physical data processing equipment. In one case, there is a one-to-one correspondence between physical devices and the respective logical node entities (116-134). In one variant of this feature, each physical device maps to a single node entity. In another variant, each physical device may map to plural node entities. For example, as will be clarified with respect to FIG. 4, a single production device may serve the role of plural node entities on different levels of the hierarchical tree 102. Indeed, a single device can even be used to implement all of the nodes entities (116-134) in the hierarchical tree 102. In another case, plural physical devices can serve the role of a single node entity. The hierarchical tree 102 can represent yet other correlations between physical devices and node entities. Further, the hierarchical tree 102 can include various combinations of the above-identified implementations.

The hierarchical tree 102 may perform a data warehousing operation, or at least part of a data warehousing operation. The hierarchical tree 102 performs this operation by distributing various data collecting, storing, processing, and managing tasks among the node entities (116-134) in the hierarchical tree 102. In one case, at least a subset of the node entities (116-134) may perform principal functions that are unrelated to the data collection and processing tasks associated with the data warehousing operation. In another case, at least a subset of node entities (116-134) is solely or principally dedicated to performing the data warehousing operation. The hierarchical tree 102 can also include a combination of non-dedicated and dedicated node entities.

For example, consider the leaf level 104 of the hierarchical tree 102. Node entities (116-122) in the leaf level 104 of the hierarchical tree 102 are referred to as leaf node entities. FIG. 1 shows a small sampling of these leaf node entities (116-122). The leaf node entities (116-122) may comprise production devices (e.g., computer servers) which provide one or more network-accessible services to users. As such, the leaf node entities (116-122) can also be referred to as production node entities. This label reflects the observation that the leaf node entities (116-122) may serve a role in producing various functions related to the delivery of a service. However, the leaf node entities (116-122) can be implemented using other types of devices (that is, besides production devices). For example, one or more of the leaf node entities (116-122) may be implemented by devices which are solely or principally dedicated to the task of collecting and processing data. In general, the leaf node entities (116-122) may encompass the data sources from which they collect data; in addition, or alternatively, the leaf node entities (116-122) may collect data from external data sources.

The data warehousing operation entails a number of tasks that the node entities (116-134) are asked to perform. Consider, for example, illustrative tasks that may be performed by the leaf node entities (116-122). Some tasks pertain to administrative operations. For example, one such task entails receiving policy information or other type of information that is passed down in step-by-step fashion through the hierarchical tree 102. The policy information instructs the leaf node entities (116-112) what type of data is to be collected, how this data is to be processed, and so on. Another data collection task entails actually collecting and storing the data. The data that is collected is referred to as collected data, or more specifically, raw collected data (where the qualifier "raw" indicates that the collected data is unprocessed or substantially unprocessed). Another data collection task entails aggregating the collected data. The leaf node entities (116-122) may perform one or more other types of tasks, and/or may omit one or more of the tasks discussed above.

The higher-level node entities (124-134) in the hierarchical tree 102 may perform a similar collection of tasks. For instance, the higher-level node entities (124-134) can optionally play a role in the collection and storage of data. The higher-level nodes entities (124-134) can also play a role in processing the collected data, such as by performing aggregation operations.

In this disclosure, the term aggregation operation is used very broadly to refer to any processing that takes place on a grouping of collected data items. One type aggregation operation applies a mathematical operation to the data items in the grouping. For example, the aggregation operation may sum together the collected data items in the grouping. In another example, the aggregation operation can count various events (such as acknowledgement messages, etc.) associated with the grouping. Another type of aggregation operation identifies members of the grouping which meet (or fail to meet) at least one prescribed criterion. For example, an aggregation operation may identify a minimum or maximum item in the grouping (such as a maximum CPU time, etc.). The term aggregation operation encompasses yet other types of aggregation operations. For example, the aggregation operation may encompass various extraction, loading, and transformation tasks performed in data warehousing operations.

In any case, the term "aggregated data" refers to the results of an aggregation operation. As will be discussed, aggregation may take place in successive aggregation operations. In this case, a subsequent aggregation operation performs aggregation operations on aggregated data provided by an immediately preceding aggregation operation. The result of this subsequent aggregation operation is referred to as further aggregated data. The outcome of a final aggregation operation (which may be performed by the root node entity 134) is referred to as final aggregated data. More generally, reference to simply "data" below may refer to both the collected data or the aggregated data, or both, or some other type of data or combination of data.

FIG. 1 clarifies one illustrative implementation of one representative leaf node entity 122 by showing an exploded view of at least some of its components. Other leaf node entities may have a similar construction, but their construction is not illustrated for brevity. This leaf node entity 122 may include one or more data sources 136 (referred to in the singular below for brevity). The data source 136 corresponds to whatever functionality or process or entity provides data to be collected using the hierarchical tree 102. For instance, as will be discussed with reference to FIG. 2, the data source 136 may comprise functionality to be monitored within data processing equipment. In this context, the data source 136 may, in part, provide a collection of measurements and/or other data items which reflect the performance of the data processing equipment. FIG. 1 shows that the leaf node entity 122 encompasses the data source 136; but, as stated, in other cases, the leaf node entity 122 can interact with one or more external data sources associated with other devices or entities.

The representative leaf node entity 122 also includes an agent module 138. One purpose of the agent module 138 is to perform the above-described data collection and processing tasks. These tasks include receiving policy information that is passed down through the hierarchical tree 102, collecting and storing data to provide collected data, and aggregating the collected data at the leaf level 104 of the hierarchical tree 102 to produce aggregated data. The agent module 138 can then send the aggregated data to its leader (parent) node (i.e., node entity 126). The agent module 138 can be implemented in any way, such as using software, hardware, firmware, etc., or any combination of these implementations. The agent module 138 stores the collected data and aggregated data in a data store 140. The data store 140 can comprise any kind of storage device(s), such as static memory devices, magnetic memory devices, optical memory devices, and so forth, or any combination thereof.

The system 100 may also include one or more optional management modules 142 (referred to in the singular below for brevity). For instance, in one example, the management module 142 can correspond to one or more dedicated severs or other data processing equipment. A user may operate the management module 142 in manual fashion to interact with the hierarchical tree 102. According to one illustrative use, a user may operate the management module 142 to investigate the performance and characteristics of the monitored equipment. The user may rely on the information gleaned from this investigation to perform trouble-shooting, capacity planning, and so on. In addition, or alternatively, the management module 142 may include automated (or semi-automated) applications which interact with the hierarchical tree 102. These applications may investigate the performance of monitored equipment, take corrective action to address failures (or anticipated failures), perform capacity planning, generate recommendations, and so on.

The management module 142 can perform a host of basic tasks and other functions. For example, the management module 142 can pass policy information and other types of information to target node entities (116-134) by passing such information to the root node entity 134 (or other initial node entity); the hierarchical tree 102 then passes this information down to the target node entities in step-by-by fashion (to be further described below). The management module 142 can also receive aggregated data from the hierarchical tree 102 via the root node entity 134 (or other representative node entity). The aggregated data available at the root node entity 134 reflects the final result of a series of aggregation operations performed at different levels of the hierarchical tree 102 (to be described below). In these examples (the dissemination of policy information and the collection of aggregated data), the management module 142 interacts with a representative of the hierarchical tree 102 (e.g., the root node entity 134), rather than each individual node entity in the hierarchical tree 102. This feature helps reduce bottlenecks in processing a large among of data.

But the management module 142 can also interact directly with any node entity in the hierarchical tree 102. For instance, the management module 142 can directly receive raw collected data and aggregated data from any leaf node entity. In general, because the management module 142 can receive various types of data, the management module 142 is an example of what is generically referred to as a receiving entity in this disclosure.

FIG. 1 corresponds to one illustrative case in which the management module 142 is a separate entity from the hierarchical tree 102. However, part of the functions performed by the management module 142 can be performed by one or more of the node entities in the hierarchical tree 102. Alternatively, all of the functions performed by the management module 142 can be performed by one or more node entities in the hierarchical tree 102. For instance, a device corresponding to the root node entity 134 can also function as the management module 142.

A later subsection describes illustrative merits of the system 100. As a preview of that discussion, note that the system 100 provides distributed processing by virtue of the use of the storage and computing resources of the plurality of node entities (116-134) in the hierarchical tree 102. This aspect helps spread out the load associated with the processing of a large quantity of data. As a consequence, the system 100 can provide both raw collected data and aggregated data relatively quickly.

Indeed, the system 100 can provide collected data and aggregated data in a manner which is substantially contemporaneous with the initial collection of this data. The phrase "substantially contemporaneously" means that the data is received in timely enough fashion for a user (and/or automated or semi-automated functionality) to use the data to exert generally timely control of the functionality or process being monitored. Based on this general guideline, the time interval implicated by the term "substantially contemporaneous" may vary for different environments. In other useful applications, the operation of the system 100 cannot be considered to be substantially contemporaneous, but nevertheless may offer better performance than data warehousing solutions which use centralized client-server operations to collect and process data.

According to another feature, the management module 142 can receive raw collected data independently of the aggregated data. This means that a user does not need to wait until the data is aggregated to receive the raw collected data. Further, the user can obtain the aggregated data at the leaf node level (or any other node level) as soon as the aggregated data is formed.

Still other features of the system 100 will be discussed below.

A.2. Illustrative Application of the System to a Production Environment

Figure 2:
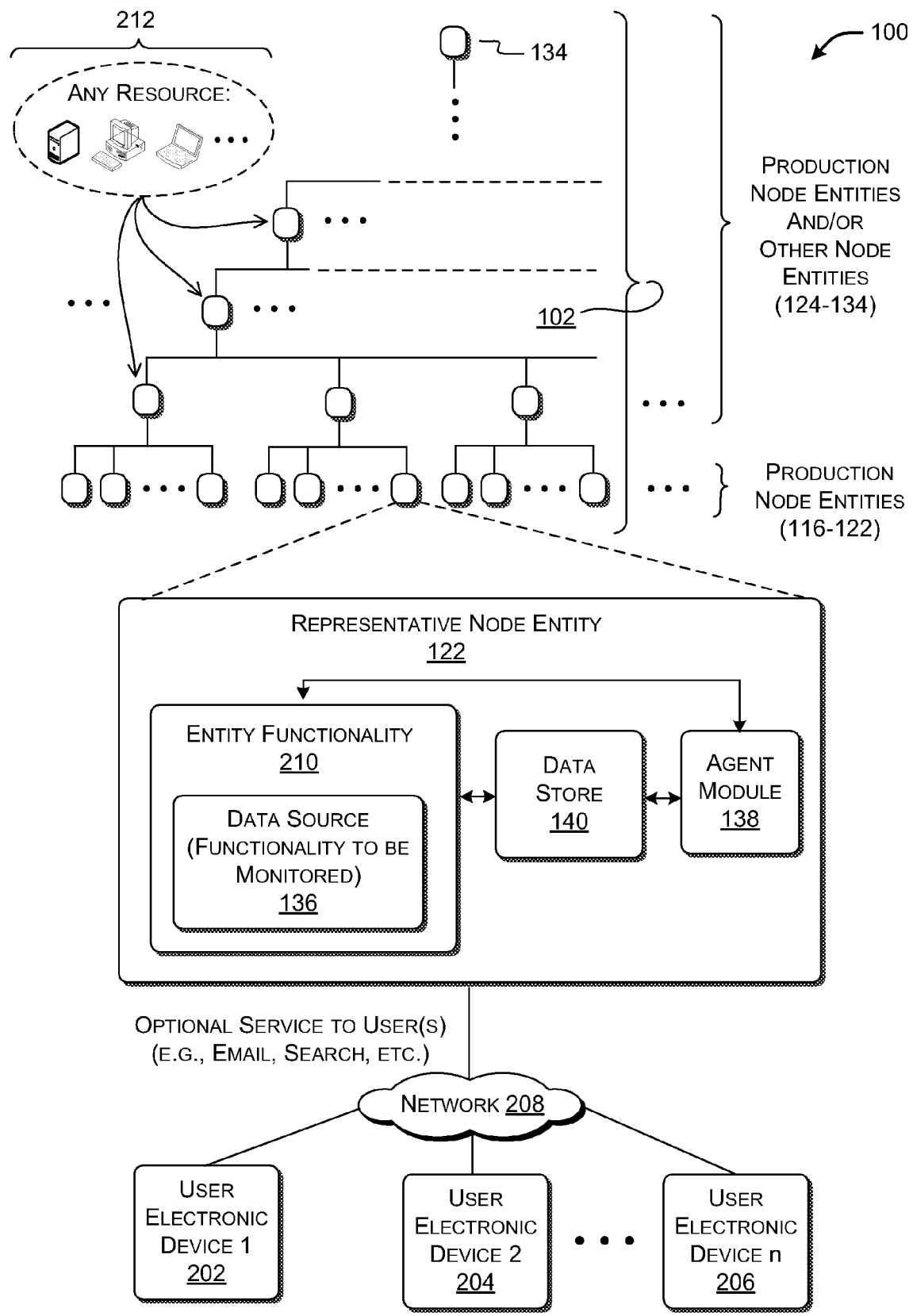
FIG. 2 shows an illustrative application of the hierarchical tree of FIG. 1 to collecting data from a plurality of production node entities; these production node entities provide one or more network-accessible services.

FIG. 2 shows one application of the system 100 to a production environment. A production environment refers to a setting in which a group of production devices provides one or more services to end-users. In the particular case of FIG. 2, the production environment uses a group of server-type computers to provide one or more network-accessible services to users. One such service is an Email operation. Another service is a search operation. Another service is a social-networking operation, and so on. No limitation is placed on the functions that a production environment can perform.

In this setting, the leaf node entities (116-122) of the hierarchical tree 102 may correspond to production devices. The representative leaf node entity 122 is shown as providing a service (along with other leaf node entities) to a group of user devices (202, 204, . . . 206) via a network 208. The user devices (202, 204, . . . 206) can correspond to any type of electronic equipment for interacting with the leaf node entity 122. For example, a representative electronic device 202 can correspond to any type of computer device (e.g., personal computer, laptop computer, etc.), personal digital assistant (PDA), mobile telephone, and so on.

The network 208 may represent any type of mechanism for allowing the user devices (202, 204, . . . 206) to interact with the leaf node entity 122. The network 208 can correspond to a wide area network (such as the Internet), a local area network (LAN), a point-to-point connection, or any combination of connectivity mechanisms. The network 208 can be physically implemented using any combination of hardwired links, wireless links, name servers, gateways, routers, and so on (not shown). The network 208 can be governed by any protocol or combination of protocols.

FIG. 2 again illustrates an exploded view of the representative leaf node entity 122. This leaf node entity 122 includes the above-described agent module 138 for performing various tasks (including receiving information, generating data, collecting data, aggregating collected data, and so on). The agent module 138 stores the collected data and aggregated data in the data store 140. Entity functionality 210 corresponds to any equipment provided by the leaf node entity 122 which allows it to furnish the network-accessible service to the user devices (202, 204, . . . 206). The entity functionality 210 may include hardware, software, firmware, etc., or any combination thereof. The data source 136 corresponds to any aspect of the entity functionality 210 to be monitored for any purpose or combination of purposes.

In one case, the agent module 138 may receive policy information which identifies the data that it is instructed to collect. The collected data may reflect the performance and/or characteristics of the entity functionality 210. Without limitation, the collected data may express: the amount of time the entity functionality 210 takes to perform various operations; the amount of memory the entity functionality 210 uses to perform various operations; the quantity and type of transactions performed by the entity functionality 210; the number and type of failures experienced by the entity functionality 210, and so on, or any combination thereof. In other words, the monitored data may reflect any kind and combination of performance metrics, logs, histories, traces, state information, and so on.

Figure 4:
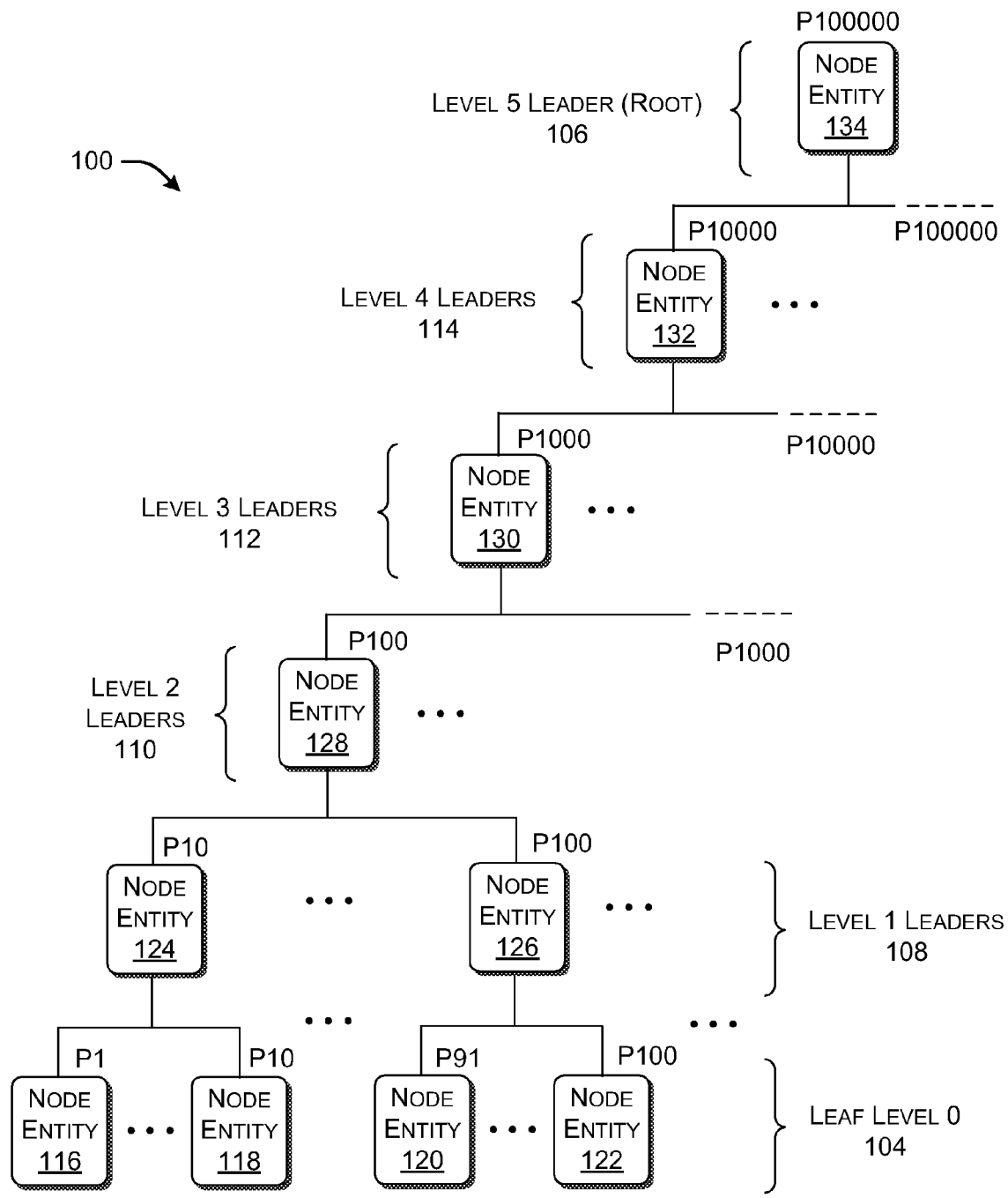
FIG. 4 shows an illustrative implementation of the hierarchical tree of FIG. 1 in which all of the tree node entities in the hierarchical tree are production node entities.

Turning attention to the hierarchical tree 102 again, as mentioned, the leaf node entities (116-112) correspond to production node entities. Or at least a subset of the leaf node entities (116-122) corresponds to production node entities. In one implementation, all of the other entities (124-134) in the hierarchical tree 102 also correspond to production node entities. In other words, all of the node entities (116-134) in the hierarchical tree can be implemented by production devices used to provide one or more services to the user devices (202, 204, . . . 206). In this example, a subset of production devices in the leaf level 104 also serve as leaders in higher-order levels (106-114) of the hierarchical tree 102. FIG. 4 will illustrate one way of implementing this embodiment. Alternatively, all of the higher-level node entities (124-134) (or some subset thereof) can be implemented by non-production devices. In general, FIG. 2 illustrates a representative sample 212 of devices that can be used to implement any node entity. These devices can correspond to server-type devices, personal desktop computers, laptop computers, set-top boxes, game consoles, and so forth.

As described above, the devices used to implement one or more node entities may serve principal functions that are unrelated to data warehousing tasks. For example, the principal function of the production devices is to deliver network-accessible services to the electronic devices (202, 204, . . . 206). Other nodes entities can correspond to tool servers, testing equipment, network devices, web servers, desktop computers, mobile telephones, personal digital assistants (PDAs), game consoles, set-top boxes, and so forth; each of these devices serves a respective principal function unrelated to data warehousing tasks.

For example, assume that the system 100 is implemented in the setting of an organization (such as a company, school, governmental organization, etc.). In this context, the various devices used in the organization can be "recruited" to serve as node entities. In other words, the hierarchical tree 102 borrows the spare storage resources and/or computing resources of these devices. A number of considerations apply to the use of the organization's devices to perform data warehousing tasks. For instance, in one exemplary case, the system 100 is operated so as not to over-burden the devices by consuming too much of their resources. This goal can be accomplished by judiciously selecting devices with sufficient spare resources and by not over-using the selected devices within the hierarchical tree 102.

In yet another case, at least some of the node entities (116-134) in the hierarchical tree 102 correspond to dedicated devices, such as dedicated servers. This equipment is dedicated insofar as its sole or principal role is to perform data warehousing-related tasks. In one variant of this concept, some of the higher level-node entities (124-134) of the hierarchical tree 102 are implemented by dedicated devices. In another case, all of the higher-order node entities (124-134) are implemented by dedicated devices.

In another implementation, the leaf node entities (116-122) are not implemented by production devices in the manner described above. In one case, the leaf node entities (116-122) can be implemented by any kind of shared-role device mentioned above (e.g., tool servers, testing servers, desktop computers, etc.), or some other shared-role device. In addition, or alternatively, the leaf node entities (116-122) can be implemented by dedicated devices. In these scenarios (in which the leaf node entities 116-122 are not themselves production devices), the leaf node entities (116-122) may interact with separate production devices or other data sources to collect data. In this context, the data collection operation performed by the leaf node entities (116-122) may entail receiving data that originates from separate production devices or other collection mechanisms. In this case, the production devices (from which the data originates) may or may not actually store the data that they provide. Further, the production devices may or may not aggregate the collected data to form aggregate data.

The concepts disclosed herein are not limited to production environments that include computer-type servers. The concepts can be applied to any environment that uses a pool of devices to collect and process data. Consider, for example, the scenario of a data warehousing operation performed by a scientific organization or community. The organization may use the hierarchical tree 102 to process sensor data supplied by a group of sensor stations. The hierarchical tree 102 can be composed of these sensor stations as, at least, leaf node entities. The hierarchical tree 102 can also optionally encompass other devices within the organization. Many other applications of the hierarchal tree 102 are possible.

In general, in one case, a single entity can provide resources that implement the hierarchical tree 102. In another case, plural entities provide resources that implement the hierarchical tree. For example, the hierarchical tree 102 may include some devices associated with a community of end users or may be entirely composed by such end user devices. In these scenarios, communication among the node entities (116-134) in the hierarchical tree can be performed at least in part using peer-to-peer (P2P) communication, with or without the inclusion of one or more server-type computers.

A.3. Illustrative Multi-component Hierarchical Tree

Figure 3:
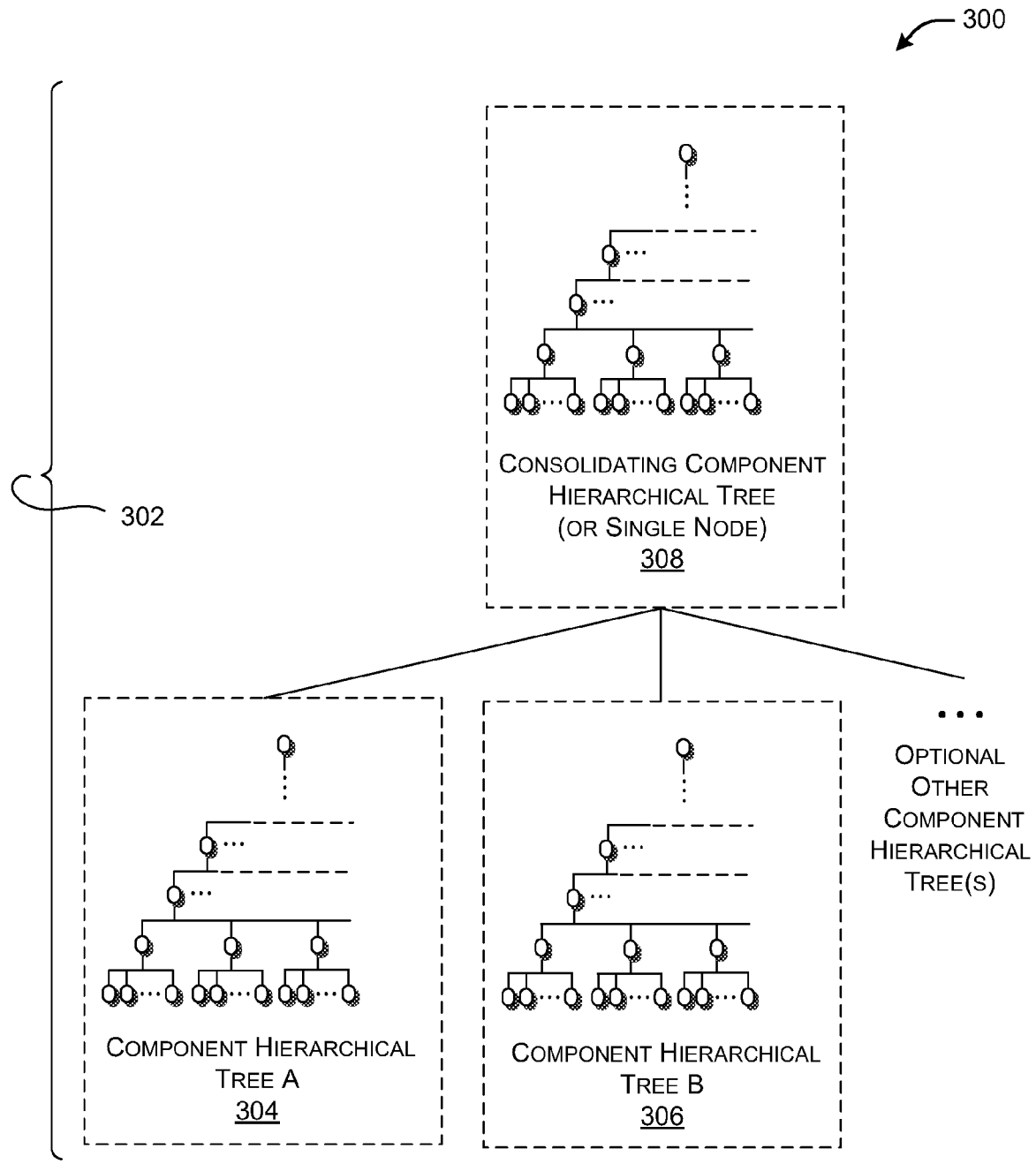
FIG. 3 shows an illustrative hierarchical tree that includes plural component hierarchical trees.

FIG. 3 shows a system 300 that provides a hierarchical tree 302 that includes multiple component hierarchical trees (304, 306, 308). Three component hierarchical trees (304, 306, 308) are shown for illustration purposes, but other implementations can include a greater or fewer number of component hierarchical trees. Generally, the collection of component hierarchical trees (304, 306, 308) forms a "forest" of such trees. Each component hierarchical tree (304, 306, 308) may be constructed in the manner described above and can operate in the manner described above.

In one case, a single service may use plural of the component hierarchical trees (304, 306, 308). For example, a data warehousing operation may entail plural main tasks. A user can use separate component hierarchical trees (304, 306, 308) to handle the respective main tasks. For example, component hierarchical tree A 304 can be assigned to handle a first warehousing operation, while component hierarchical tree B 306 can be assigned to handle a second warehousing operation, and so on.

Alternatively, or in addition, a user may assign separate component hierarchical trees (304, 306, 308) to handle different respective services. For example, the component hierarchical tree A 304 can be assigned to handle an Email service, while the component hierarchical tree B 306 can be assigned to handle a search service, and so on.

The system 300 shown in FIG. 3 may include one or more overarching component hierarchical trees for merging the results of individual component hierarchical trees. For example, the system 300 includes a consolidating component hierarchical tree 308 which consolidates the results of component hierarchical tree A 304 and component hierarchical tree B 306. For example, component hierarchical tree A 304 can provide first final aggregated data, while the component hierarchical tree B 306 can provide second final aggregated data. The consolidating component hierarchical tree 308 can be used to combine the first aggregated data with the second aggregated data to yield a higher-order aggregation result.

Further, the consolidating component hierarchical tree 308 can be used for other functions. For example, the consolidating component hierarchical tree 308 can be used to receive raw collected data from any other component hierarchical tree (304, 306). Further, the consolidating component hierarchical tree 308 can be used to pass information (such as policy information) to node entities in any component hierarchical tree (304, 306) in a more global manner than described above.

The consolidating component hierarchical tree 308 can include any number of levels, including a single level. Indeed, the consolidating component hierarchical tree 308 can comprise a single node. The management module 142 (not shown in FIG. 3) can use the single node to interact with the "child" component hierarchical trees (304, 306). Or the management module 142 can itself serve as the single node.

The component hierarchical trees (304, 306, 308) can be correlated with physical data center infrastructure in any manner. In one case, a single data center can implement all of the component hierarchical trees (304, 306 308). In another case, plural data centers are used to implement the component hierarchical trees (304, 306, 308); indeed, plural data centers can be used to implement even a single component hierarchical tree. This means that, in one case, different component hierarchical trees (304, 306, 308) may be associated with different geographical locations (that is, where the different geographical locations correspond to the different locations of the data centers).

The node entities in the component hierarchical trees can map to physical devices in any manner. In one case, there is a one-to-one correspondence between node entities and physical devices. In another case, a single physical device can serve the role of plural node entities. For instance, a single physical device can serve the role of a node entity in component hierarchical tree A 304 and component hierarchical tree B 306. This scenario may correspond to the case in which a single physical device performs two (or more) main functions. The system 300 can use component hierarchical tree A 304 for performing a data warehousing operation pertaining to the first function and component hierarchical tree B 308 for performing a data warehousing operation pertaining to the second function. In this implementation, the single physical device can include a single agent module that can be configured to operate in two different contexts. First policy information can be used to define how the agent module operates in a first context, while second policy information can be used to define how the agent module operates in a second context. Alternatively, the single physical device can include two agent modules corresponding to the two different contexts.

A.4. Implementation of Hierarchical Tree Using all Production Node Entities

As discussed above, one implementation of the hierarchical tree 102 uses all production devices to implement the node entities (116-134) in the hierarchical tree 102. Assume, in this merely illustrative case, that there are 100,000 node entities (116-134) in the hierarchical tree 102. FIG. 4 shows one way of implementing such a hierarchical tree 102. The management module 142 performs the task of setting up and maintaining the hierarchical tree 102, or at least plays a role in setting up and maintaining the hierarchical tree 102. For instance, the management module 142 can assign physical devices to node entities and store information which describes such mapping. Alternatively, some other module or combination of modules can be used to generate and maintain the hierarchical tree 102.

The operation of setting up the hierarchical tree 102 begins by dividing the leaf node entities (116-120) into a plurality of groups. Different group sizes may be appropriate for different environments. An appropriately sized group is selected for a given environment to ensure adequate performance of the data warehousing operation (and/or based on other application-specific factors). In the merely illustrative case of FIG. 4, the leaf node entities (116-122) are divided into groups of ten node entities. For example, a first group includes leaf node entity 116 to leaf node entity 118 (where there are members of this group that are omitted from FIG. 4 for the sake of simplicity). A second group includes leaf node entity 120 to leaf node entity 122, and so forth. Each node entity is labeled with a prefix of "P" to indicate that it corresponds to a production (P) node device. The first group includes production devices P1-P10, while the second group (which represents a last group in a branch of the hierarchical tree 102) includes production devices P91-P100. FIG. 4 omits intermediary groups between the first group and the second group for the sake of simplicity.

The set-up operation involves selecting a leader for each group that will serve as the representative of that group in the next higher level of the hierarchical tree 102. Any rule or combination of rules can be used to select the leaders. In the merely illustrative case of FIG. 4, the set-up operation ranks the node entities in a group from lowest ID to highest ID, and then selects the node entity having the highest ID as the leader of that group. Thus, node entity 118 having an ID of P10 is selected as the leader for the first group, while node entity 122 having an ID of P100 is selected as the leader for the second group.

The leaders selected in the leaf level 104 are promoted to serve as members of the next higher level 108. Thus, the level 108 includes node entity 124 and node entity 126, which corresponds to node entity 118 and node entity 122, respectively. The level 108 includes other members (not shown) corresponding to the leaders of other groups (not shown) in the leaf level 104. The set-up operation then repeats the above processing with respect to the members in the level 108. Namely, node entity 124 has an ID P10, while node entity 126 has an ID of P100. Thus, the set-up operation promotes the node entity 126 to serve as a member of the next highest level 110 of node entities. This process continues until the root node entity 134 has been selected. The root node entity 134 bears the ID label P100000. As demonstrated, the set-up operation can create the hierarchical tree 102 in a bottom-up fashion.

Other implementations can use different rules to select leaders. In another case, the management module 142 (or some other module) can employ optimization logic to more fairly distribute the load imposed by the hierarchical tree 102 among a pool of available candidate devices from which to choose.

In one case, the hierarchical tree 102 created by the set-up operation is balanced (e.g., by employing symmetric groupings and structure, etc.). In another case, the hierarchical tree is unbalanced. For instance, the hierarchical tree 102 can include groupings having different respective sizes.

In one case, the hierarchical tree 102 created by the set-up operation is relatively static, meaning that its structure remains relatively fixed throughout a data warehousing operation. In another case, the structure of the hierarchical tree 102 can be dynamically varied in the course of a data warehousing operation (e.g., to account for changes in resource availability, changes in leadership roles, and so on).

The hierarchical tree 102 of FIG. 4 is created using production devices. The principles described above can be used to set up hierarchical trees that include other types of devices, such as dedicated servers, tool servers, testing servers, user computers, network devices, and so forth. Each of these hierarchical trees can be populated with one type of device or a combination of different types of devices.

A.5. Illustrative Agent Module Details

Figure 5:
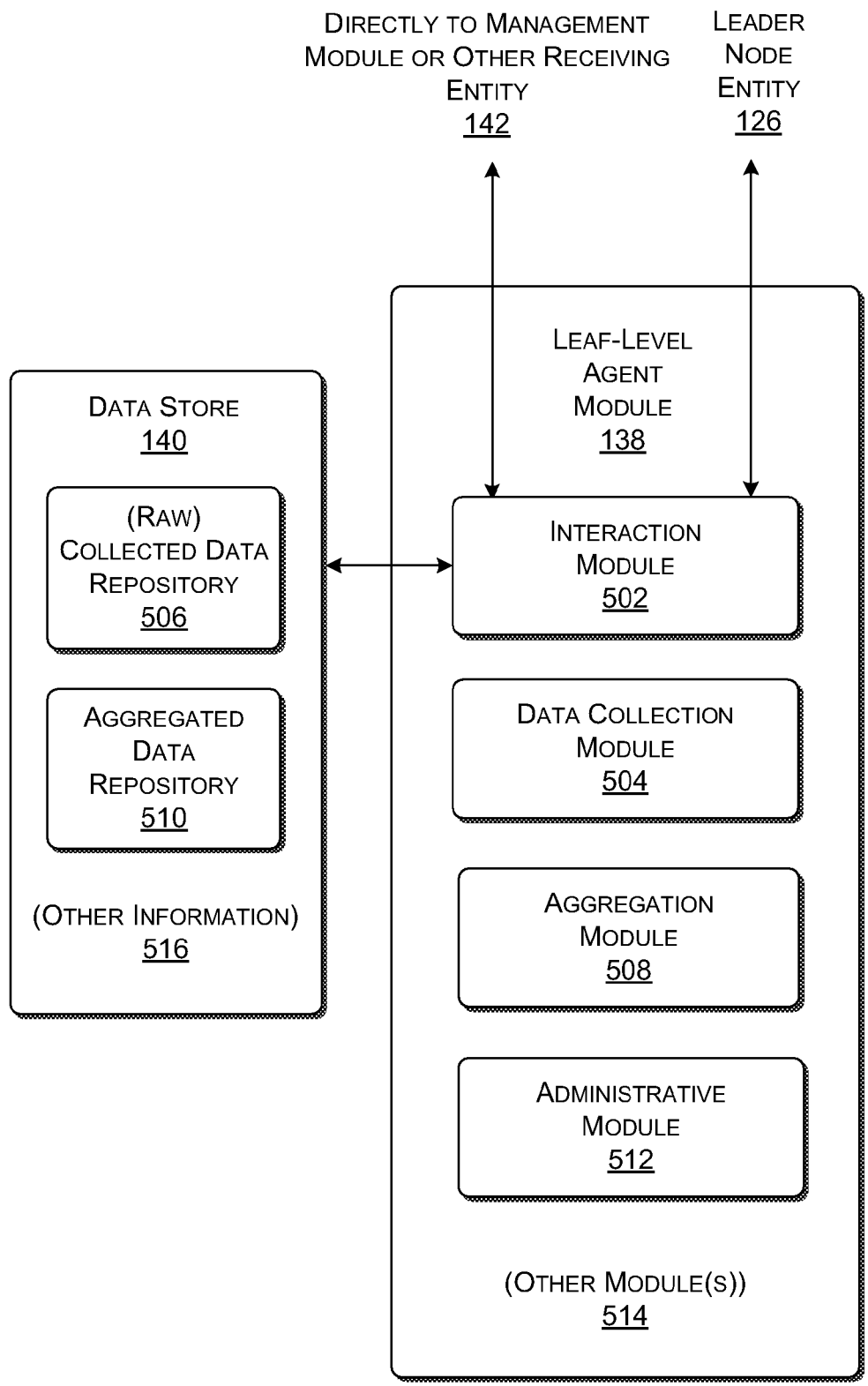
FIG. 5 shows a representative agent module for use in a leaf node entity of the hierarchical tree of FIG. 1.

FIG. 5 shows additional details regarding the agent module 138. Since the agent module 138 is implemented on the leaf node entity 122, FIG. 5 labels it as a leaf-level agent module. As mentioned above, the agent module 138 serves various data warehousing-related tasks.

The agent module 138 includes or can be conceptualized to include plural component modules. A first module is an interaction module 502. One purpose of the interaction module 502 is to communicate with other entities of the system 100 (of FIG. 1). For instance, the interaction module 502 allows the agent module 138 to communicate with its leader node entity, namely, node entity 126. The interaction module 502 also allows the agent module 138 to communicate with any other entity, such as the management module 142. The interaction module 502 also optionally provides an interface to the data source 136 (shown in FIG. 1), the data source 140, and so on. The interaction module 502 also interacts with other modules provided by the agent module 138. This allows other parts of the agent module 138 to communicate with various entities in the system 100. However, in another implementation, other parts of the agent module 138 can include separate respective interface functionality which allows them to directly interact with various entities in the system 100 (that is, without using the interaction module 502).

The agent module 138 also includes a data collection module 504. One purpose of the data collection module 504 is to collect data from the data source 136 and store such data in a collected data repository 506 of the data store 140. In one non-limiting case, the data collection module 504 can collect and store data at periodic intervals, such as every second. The interaction module 502 may to requests from the management module 142 (or any other requesting entity) by retrieving collected data from the data store 140 and sending the collected data to the management module 142.

As described above, the data collection module 504 can directly collect data from the data source 136. In another implementation, the data collection module 504 indirectly collects data from the data source 136. That is, consider the case in which the leaf node entity 122 is not a production device, but is rather connected to a separate production device (not shown). In this case, the separate production device may perform the initial collection of data from the data source 136. The data collection module 504 in the leaf node entity 122 may collect the data by simply receiving the already-collected data from the production device.

The agent module 138 also includes an aggregation module 508. One purpose of the aggregation module 508 is to perform an aggregation operation on the collected data stored in the data store 140. As mentioned, an aggregation operation can include any type of processing performed on a group of data items. The aggregation operation may involve summing the collected data items, counting the collected data items, determining minimum or maximum values in the collected data items, and so on. In one case, the aggregation module 508 can perform these computations at periodic intervals, such as every minute. That is, at the end of every minute, the aggregation module 508 can aggregate data items that have been collected over the course of that minute. The aggregation module 508 can alternatively, or in addition, perform aggregation in response to other triggering events, such as by performing aggregation on an as-needed basis (e.g., based on the amount of collected data), or by performing aggregation when instructed to. The result of the aggregation operation is aggregated data, which can be stored in an aggregated data repository 510 of the data store 140. The aggregation module 508 can also perform aggregation over longer time intervals by aggregating previously aggregated data. For example, the aggregation module 508 can perform aggregation over an hour interval based on the sixty instances of aggregated data that have been stored in the course of that hour.

The interaction module 502 in conjunction with the aggregation module 508 can send the aggregated data to its leader node entity 126. This allows the leader node entity 126 to make a more encompassing aggregation (that is, by combining the received aggregated data with the aggregated data from other leaf node entities). The interaction module 502 in conjunction with the aggregation module 508 can also, upon request or based on other triggering event, send the aggregated data directly to the management module 142 or some other receiving entity.

In one example, the data store 140 can store its data in file format. The data store 140 can also link together all of the related data that it collects. This facilitates analysis of this data at a later time. The data store 140 can also maintain metadata for the information that it locally stores. The data store 140 can also store metadata for collected data pertaining to the leaf node entity 122 that is stored elsewhere (that is, in the case that the collected data is not stored within the device associated with the leaf node entity 122).

The agent module 138 also includes an administrative module 512. One purpose of the administrative module 512 is to receive policy information from higher levels of the hierarchical tree 102 (in a manner to be described below) via the interaction module 502. The policy information provides instructions that describe how the agent module 138 is to be operated. The administrative module 512 uses the policy information to govern the operation of the agent module 138. The administrative module 512 can receive other types of information, such as commands, software patches, etc.

For example, the policy information may provide instructions that govern the collection and storage of data. The instructions may specify what data is to be collected, where the data is to be collected from, how the data is to be collected, where the data is to be stored, how long the data is to be stored (after which it can be deleted), and so on. The policy information may provide instructions that also govern the manner in which data is to be provided to other entities (such as the leader node entity 126, the administrative module 142, and so on). The policy information may also provide instructions that govern the utilization of device resources by the agent module 138. For instance, the agent module 138 may be implemented on a device that serves other functions; in this case, the policy information may provide throttling rules that govern how much of the device's free resources can be used for data warehousing operations. Generally, various component modules of the agent module 138 can use the policy information to govern their operations.

As described above, a single device can perform the role of two or more node entities in one or more hierarchical trees. In this case, the device can include a single agent module that can receive policy information for each separate function that it performs. For example, the agent module can receive first policy information that governs its operation in a context of a first hierarchical tree, second policy information that governs its operation in a context of a second hierarchical tree, and so on. In another implementation, the device can include different agent modules associated with the different roles it performs.

The interaction module 502 in cooperation with the administrative module 512 may generate an acknowledgement upon the successful receipt of the policy information (or other information) that it receives. The interaction module 502 can forward this acknowledgement to its leader node entity 126. The leader node entity 126 can then pass the acknowledgement to its own leader node entity 128. This process can be repeated, allowing the hierarchical tree 102 to percolate the acknowledgement up to the root node entity 134. At each stage, a leader node entity will aggregate the acknowledgements received from all of its children node entities. For example, the leader node entity 126 can determine how many of its child node entities (120 to 122) successfully received the information and how many did not. In this manner, the root node entity 134 will eventually have information which reflects how many node entities in the entire hierarchical tree 102 correctly received the information (and how many did not).

FIG. 5 indicates that the agent module 138 may include other functions (e.g., by virtue of the label entitled "other modules" 514). FIG. 5 indicates that the data store 140 can be asked to store additional fields of data (e.g., by virtue of the label entitled "other information" 516).

The agent module 138 can be implemented using software, hardware, firmware, and so on, or any combination of these implementations. In the case of software, firmware, and the like, the agent module 138 can be implemented by computer-readable instructions executed on one or more processing devices. The computer-readable instructions may provide interaction module logic which performs the functions of the interaction module 502, collection module logic which performs the functions of the data collection module 504, aggregation module logic which performs the functions of the aggregation module 508, administrative module logic which performs the functions of the administrative module 512, and so on.

Figure 6:
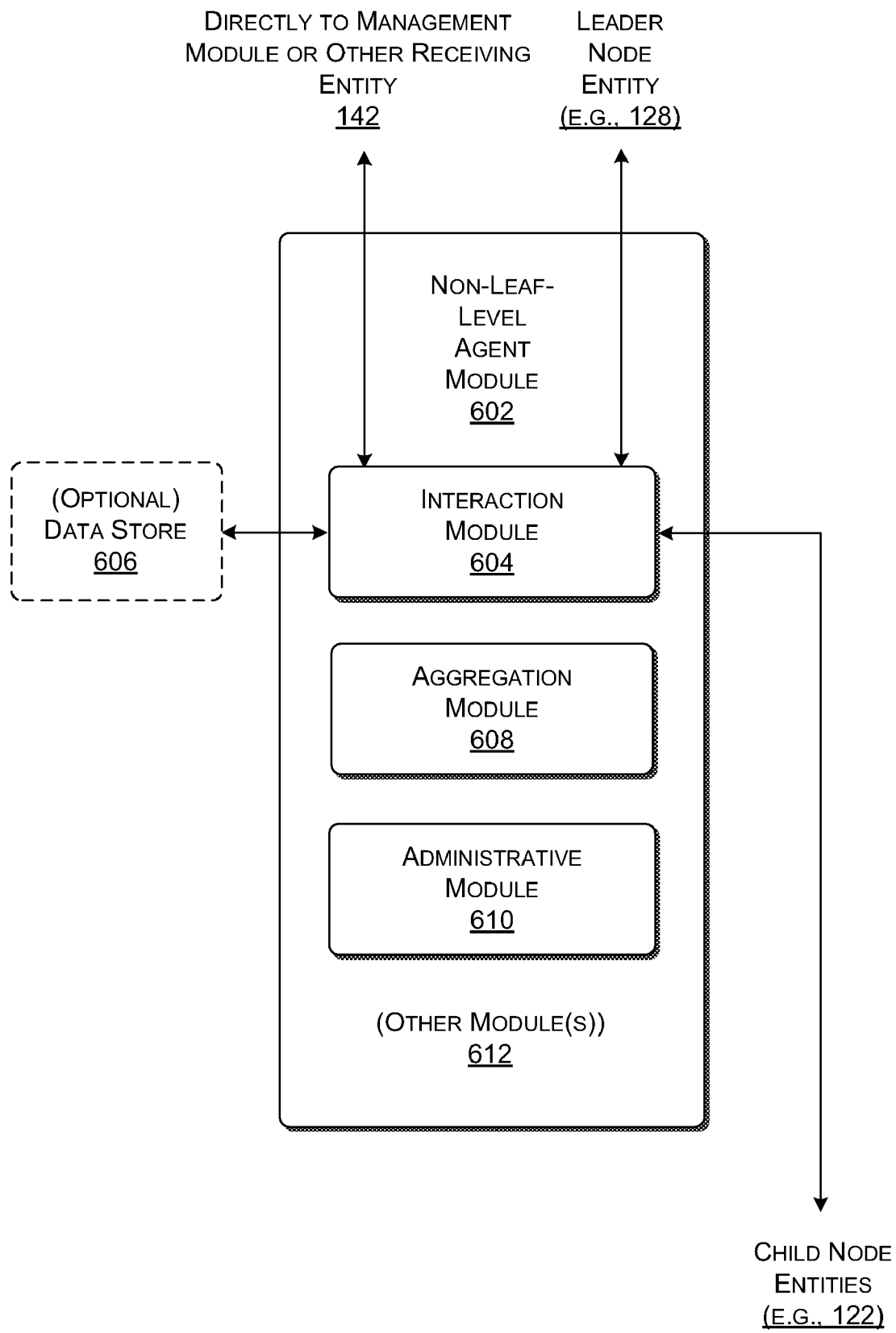
FIG. 6 shows a representative agent module for use in a non-leaf node entity of the hierarchical tree of FIG. 1.

Non-leaf node entities may also include an agent module for performing their respective data warehousing roles in the hierarchical tree 102. FIG. 6 shows one such agent module 602 that is resident on a non-leaf node entity. For example, the agent module 602 may be implemented by the node entity 126, which is the leader (parent) of leaf node entity 122 described above.

A first module is an interaction module 604. Like the case of FIG. 5, one purpose of the interaction module 604 is to communicate with other entities of the system 100 (of FIG. 1). For instance, the interaction module 604 allows the agent module 602 to communicate with its own leader node, namely, node entity 128. The interaction module 604 also allows the agent module 602 to communicate with any other entity, such as the management module 142. The interaction module 602 also allows the agent module 602 to communicate with its child nodes, for example, node entity 122. The interaction module 604 provides other interfacing features similar to those described above with respect to FIG. 5

Although not shown, any leader node entity can include a collection module for assisting the leaf node entities (116-122) in collecting and/or storing data or for handling all collecting and/or storing tasks. For instance, in an alternative case to that described with reference to FIG. 5, the hierarchical tree 102 can use one or more leader node entities to collect and/or store data. To this end, FIG. 6 shows the optional use of a data store 606 that is available for use by the agent module 602. More generally, data can be distributed and stored anywhere in the hierarchical tree 102, that is, in any combination of node entities. Further, data collected from even a single data source 136 can be stored in distributed fashion in multiple different locations within the hierarchical tree 102.

The agent module 602 also can include an aggregation module 608. One purpose of the aggregation module 608 is to perform a further aggregation operation on aggregated data received from its child nodes, such as leaf entity node 122. The further aggregation operation can carry out the same operation performed by leaf node entity's 122 aggregation module 138; but in this case, the input data to this aggregation operation is the aggregated data received from its child nodes. For example, assume that the nature of the aggregation operation is to find the maximum value in a series of collected data items. The aggregation module 608 can receive a group of maximum values from its child node entities (reflecting the respective outcomes of aggregation operations performed by those child node entities). The aggregation module 608 can then pick the maximum value within this group of maximum values. The result of this further aggregation operation is referred to as further aggregated data.

The aggregation module 608 in cooperation with the interaction module 604 can pass the further aggregated data to its leader node entity (e.g., leader node entity 128), whereupon another aggregation operation is performed in the manner described above. The aggregation module 608 may optionally store its aggregated data in an optional local data store 606. However, in other implementations, the aggregation module 608 in cooperation with the interaction module 604 simply passes the aggregated data to its leader node entity 128 without locally storing this information.

The agent module 602 also includes an administrative module 610. One purpose of the administrative module 610 is to receive policy information from its leader node entity (e.g., leader node entity 128) and then forward this policy information to its child node entities (including child node entity 122). The administrative module 610 can forward any other information in the above-described manner. The administrative module 610 can use the policy information that it receives to govern the operation of the various modules of the agent module 602 in the manner described above with respect to FIG. 5.

FIG. 6 indicates that the agent module 602 may include other functions (e.g., by virtue of the label entitled "other modules" 612).

The agent module 602 can be implemented using software, hardware, firmware, and so on, or any combination of these implementations.

As described above, in some cases, there can be a one-to-one mapping of devices to node entities. In this case, the agent module 602 serves the sole role governing the operation of the leader node entity 126. In another case, a single device can serve the role of a leaf node entity and a non-leaf node entity (or plural non-leaf node entities). In this case, the agent module 602 can serve plural different roles corresponding to its use in governing the operation of plural node entities. In another implementation, the single device can include plural different agent modules, each governed by associated policy information.

A.6. Illustrative Features of the System

The above-described system 100 has characteristics that may be beneficial in many environments. For example, the system 100 may offer one or more of the features identified below.

As mentioned above, the system 100 can allow a user or other entity to access collected data and aggregated data substantially contemporaneously with the collection of this data. For instance, in one non-limiting environment, the monitoring module 142 (or any other entity) is able to access raw collected data and aggregated data from the representative leaf node entity 122 in a few seconds or less. The monitoring module 142 (or any other entity) is able to access aggregated data from higher nodes in the hierarchical tree 102 in approximately 30 seconds or less. This allows a user or other entity to be quickly informed of the state of the functionality or processes being monitored, and possibly make corrective changes in a timely manner. The response times of other applications of the system 100 may differ from the above-cited example; but, in any case, the response times can be considered substantially contemporaneous if they allow a user (or other entity) to take timely corrective action to the functionality or processes being monitored. In other applications, the response times may not qualify as substantially contemporaneous.

The system 100 is readily scalable. The system 100 scales well because storage and computing demands are well distributed among the resources of the hierarchical tree 102.

The system 100 is dynamic. The system 100 is dynamic because it enables both routine and specialized (e.g., ad hoc) reporting to be performed.

The system 100 allows selective access to a large of body information. This permits a user (or other entity) to perform more accurate failure analysis, capacity management, and so forth.

The system 100 is potentially less expensive than some other kinds of data warehousing solutions. This is because the system 100 requires less (or no) use of complex centralized data warehousing systems.

The list of features identified above is representative, not exhaustive. Further, some implementations of the concepts described here may not embody one or more (or any) of the features identified above.

B. Illustrative Manner of Operation

B.1. Illustrative Signal Path Diagrams

Figure 7:
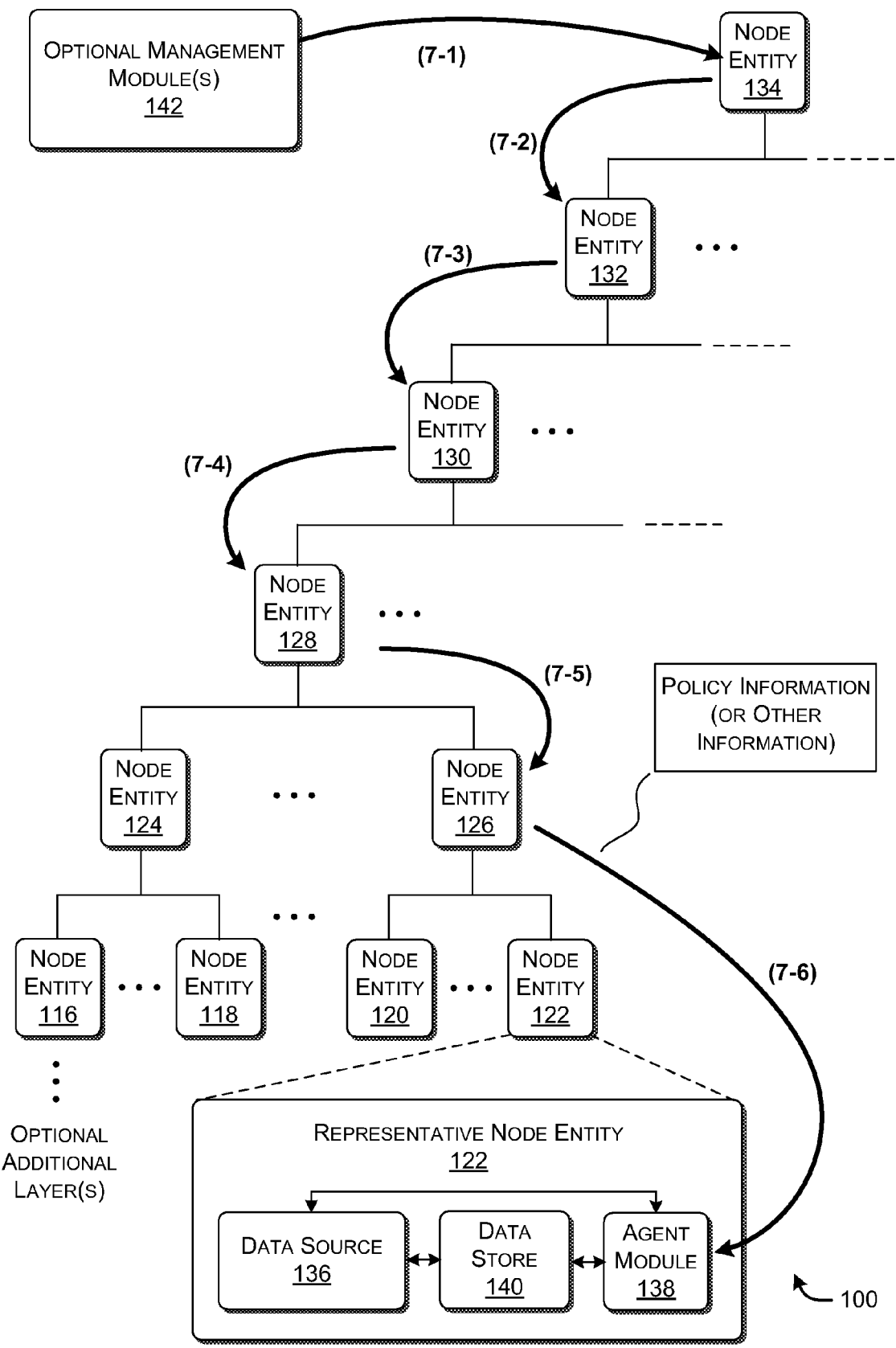
FIG. 7 shows an illustrative use of the hierarchical tree of FIG. 1 to pass information from a root node entity (or other initial node entity) of the hierarchical tree to one or more targeted leaf node entities.
Figure 8:
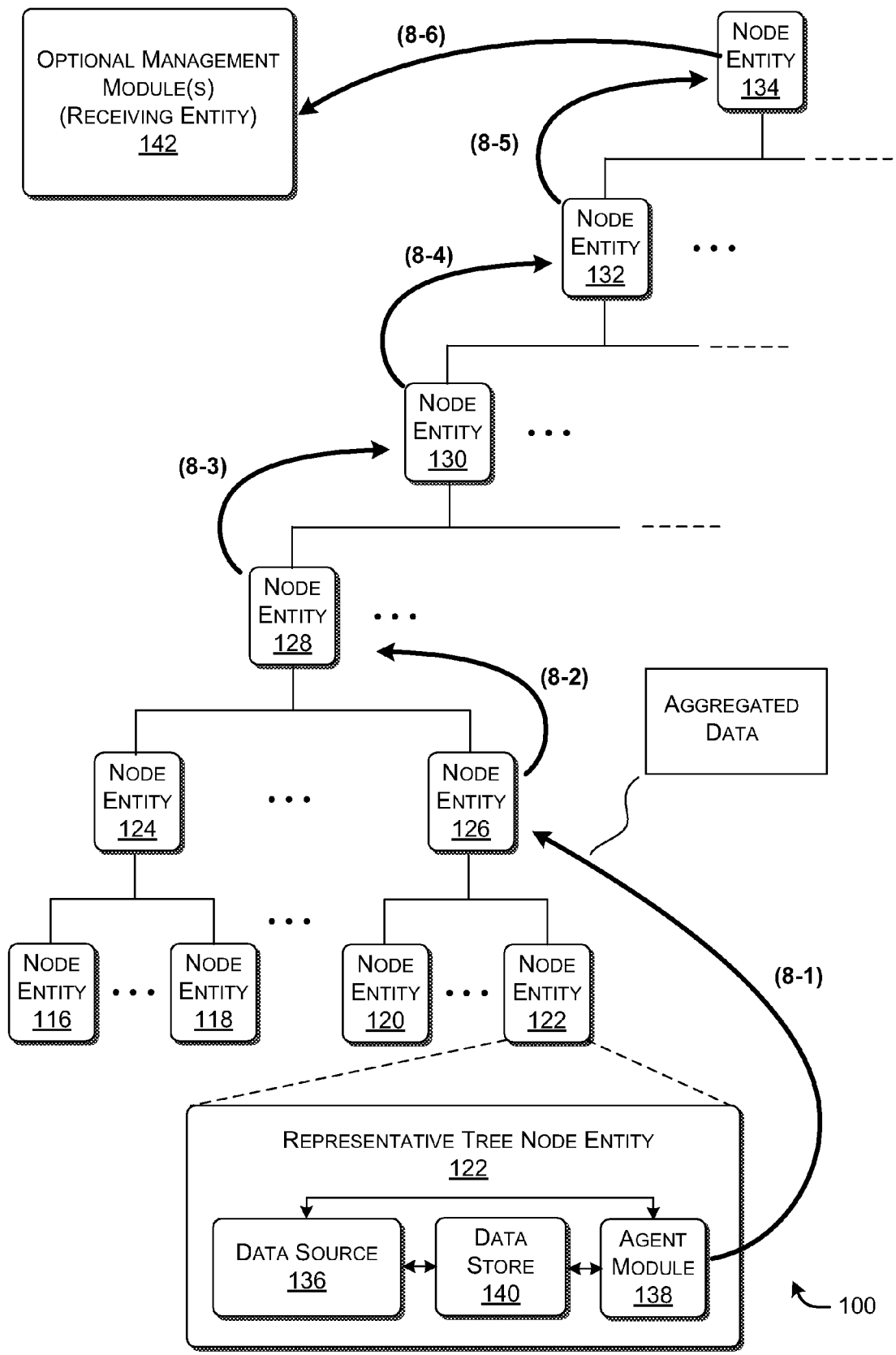
FIG. 8 shows an illustrative use of the hierarchical tree of FIG. 1 to pass aggregated data from the leaf node entities to the root node entity.
Figure 9:
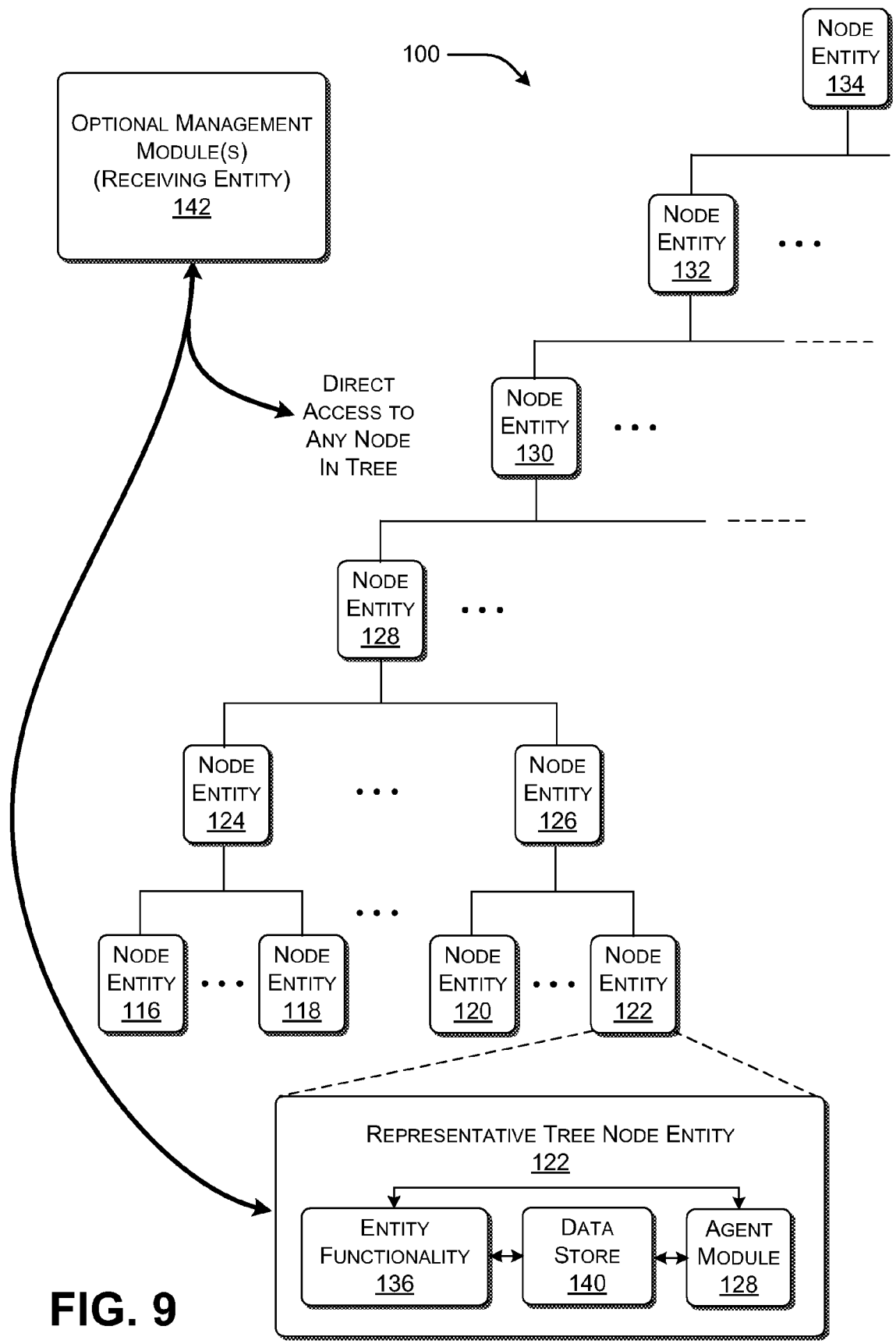
FIG. 9 shows an illustrative use of the hierarchical tree of FIG. 1 to directly receive raw collected data and/or aggregated data from any tree node entity.

FIGS. 7-9 illustrate the above-described operation of the system 100 by showing the representative flow of information through the hierarchical tree 102 for different functions that may be performed. Since the functions in FIGS. 7-9 have already been described in Section A, the following explanation will serve mainly as a summary and review of the previous description.

Starting with FIG. 7, this figure shows how the management module 142 or some other entity (or entities) within the system 100 can disseminate policy information (or some other information) to target node entities in the hierarchical tree. For example, the aim of this operation may be to distribute policy information to target leaf node entities, such as representative leaf node entity 122.

The series of numbered arrows illustrate one path that can be used to distribute the policy information to leaf node entity 122. In operation (7-1), the management module 142 transfers the policy information to the root node entity 134. In operation (7-2), the root node entity 134 forwards the policy information to its child nodes (including child node entity 132). In operation (7-3), the child node entity 132 then forwards the policy information to its own child node entities (including node entity 130), and so on. This process is repeated until the policy information trickles down to its eventual destination. One such destination is the information processing module 510 provided by the leaf node entity 122, as reflected by the final operation (7-6).

As described above, each of the target node entities which receive the policy information may send an acknowledgement to its immediate leader node entity. Each leader node entity can consolidate the acknowledgements that it receive from its child nodes and send aggregated acknowledgement information to its own leader node entity. This process is repeated until the root node entity 134 receives a final tally of how many intended leaf node entities correctly received the policy information and how many did not.

FIG. 8 shows how the aggregated data can be percolated up from leaf node entities (116-122) to the root node entity 134 (or some other higher-order destination node entity). The numbered arrows show one illustrative path that the aggregated data can take in reaching the root node entity 134.

In a first operation (8-1), the agent module 138 of the leaf node entity 122 sends its aggregated data to its leader node entity 126. The leader node entity 126 then performs another aggregation operation on the received aggregated data from leaf node entity 122, together with the aggregated data received from all of its other child node entities. This operation yields further aggregated data. In operation (8-2), the node entity 126 forwards the further aggregated data to its own leader node entity 128, upon which the entire above-described process is repeated. As stated, this procedure is repeated a number of times until the root node entity 134 performs a final aggregation operation. In operation (8-6), the root node entity 134 may transfer the final aggregated data to the management module 142 or some other receiving entity. Or the root node entity 134 may be the final destination of the aggregated data.

In one illustrative and non-limiting case, the above process may be used to advance per-minute aggregated data to the root node entity 134. The system 100 allows a user (or other entity) to also obtain larger-interval aggregated data. In one technique, the management module 142 (or some other entity) can access the per-minute aggregated data from the root node entity 134. The management module 142 can use the per-minute aggregated data to compute larger-interval aggregated data, such as hourly aggregated data, daily aggregated data, and so on. Or the root node entity 134 itself can be used to compute the larger-interval aggregated data based on its per-minute aggregated data. The leaf node entities (116-122) may also compute and store larger-interval aggregated data. The management module 142 or some other entity can directly access this local data from the leaf node entities (116-122). In one approach, the leaf node entities (116-122) do not percolate up larger-interval aggregated data (in the manner shown in FIG. 8), but it is also possible to do so.

In general, the leaf node entities (116-122) may generate a significant amount of collected data. In one approach, the system 100 only percolates up a subset of this data to the root node entity 134 for reporting. The management module 142 can access additional data directly from the leaf node entities (116-122). This feature helps reduce data traffic in the hierarchical tree 102.

FIG. 9 illustrates the manner in which the management module 142 or some other entity can directly access any data from any node entity in the hierarchical tree 102, such as the representative leaf node entity 122. The bold arrows illustrate the interaction between management module 142 and the node entities (116-134) in the hierarchical tree 102.

In one example, the management module 142 can access raw collected data from the leaf node entity 122. In another case, the management module 142 can access aggregated data from the leaf node entity 122.

B.2. Illustrative Flowcharts

FIGS. 10-14 illustrate the operation of the system 100 (or other type of system) in flowchart form. To facilitate discussion, certain operations are described in FIGS. 10-14 as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowcharts have already been set forth above, the following explanation will again serve as a summary and review of those functions.

Figure 10:
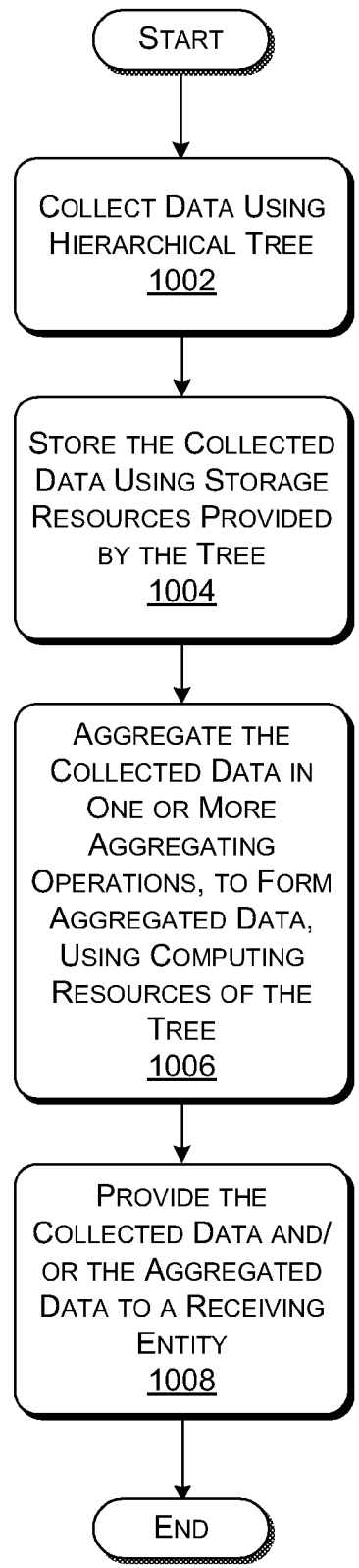
FIG. 10 is a flowchart that shows an illustrative overview of one manner of providing data using a hierarchical tree.

Starting with FIG. 10, this figure shows an illustrative procedure 1000 that represents an overview of the operation of the system 100. Block 1002 entails collecting raw data using the hierarchical tree 102 and/or some other node entities. In one case, the leaf node entities (116-122) are used to directly collect the data from local data sources. In another case, the leaf node entities (116-122) receive data that is originally collected by some other entities (such as separate production devices). Other node entities in the hierarchical tree 102 can also perform a role in data collection. Block 1004 entails storing the collected data using storage resources of the hierarchical tree 102 (e.g., in the data stores of the leaf node entities 116-122 and/or at other locations in the hierarchical tree 102). Block 1006 entails aggregating the collected data in one or more aggregation operations to form aggregated data. The operation in block 1006 uses the computing resources of the hierarchical tree 102 (such as the aggregation modules provided by respective node entities). Block 1008 entails providing the collected data and/or aggregated data to a receiving entity. The receiving entity may correspond to the management module 142, but the term "receiving entity" encompasses any recipient of the data. More specifically, block 1008 may entail percolating aggregated data up to the receiving entity in the manner described above (e.g., in FIG. 8). Block 1008 may also encompass providing data directly to the receiving entity (e.g., by directly supplying collected data and/or aggregated data from the leaf node entity 122 to the management module 142, e.g., in the manner shown in FIG. 9).

Figure 11:
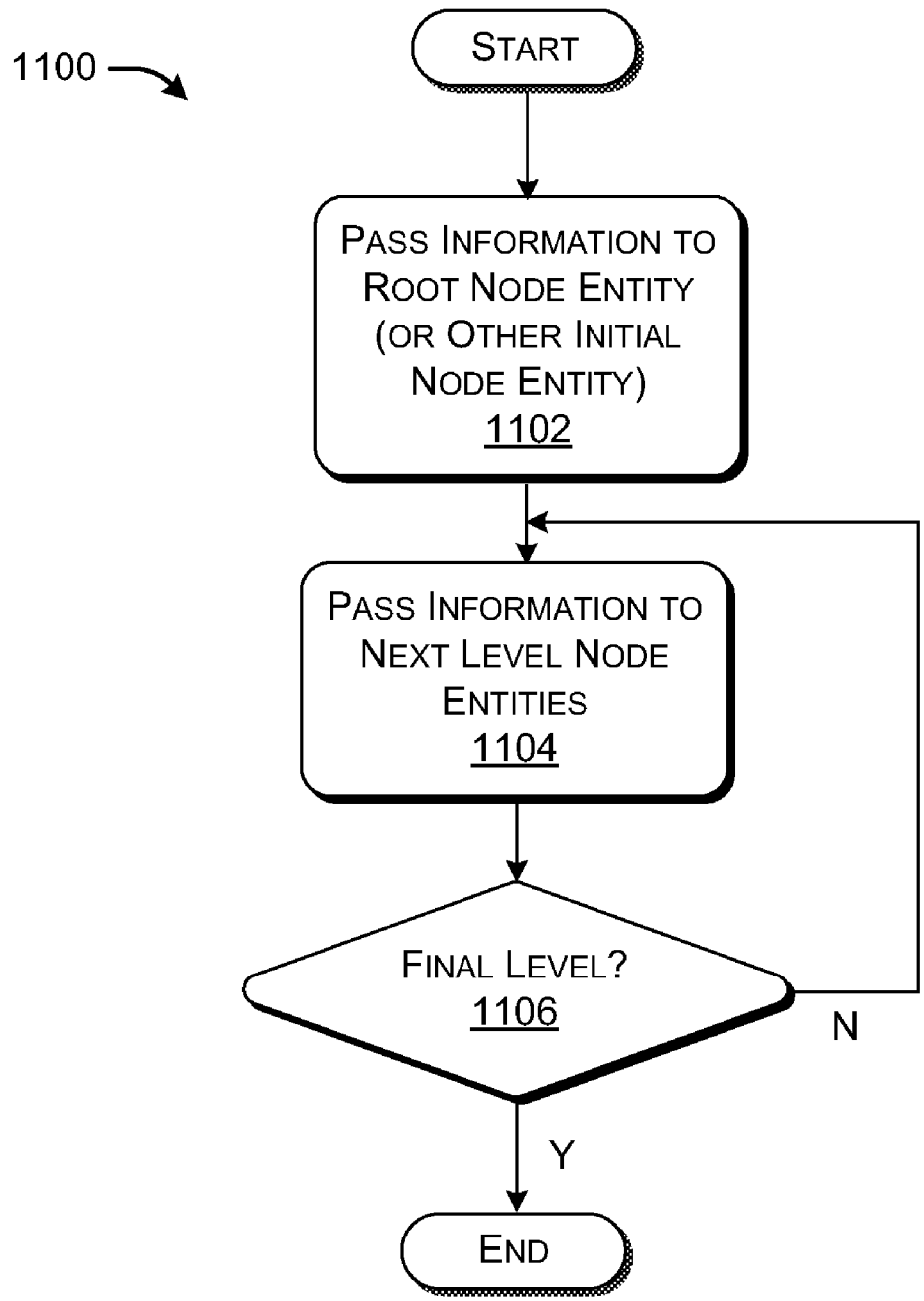
FIG. 11 is a flowchart that shows an illustrative way to pass information to one or more targeted leaf node entities in a hierarchical tree.

FIG. 11 shows an illustrative procedure 1100 that explains how information may be passed down through the hierarchical tree 102 to one or more target node entities. The information may correspond to policy information or some other type of information. Block 1102 entails sending the information to the root node entity 134 or some other initial node entity. Block 1104 entails passing the information to the child node entities in the next lowest level. Block 1106 indicates that block 1104 is repeated a number of times until the information advances, in step-by-step fashion, to the intended target node entities.

Figure 12:
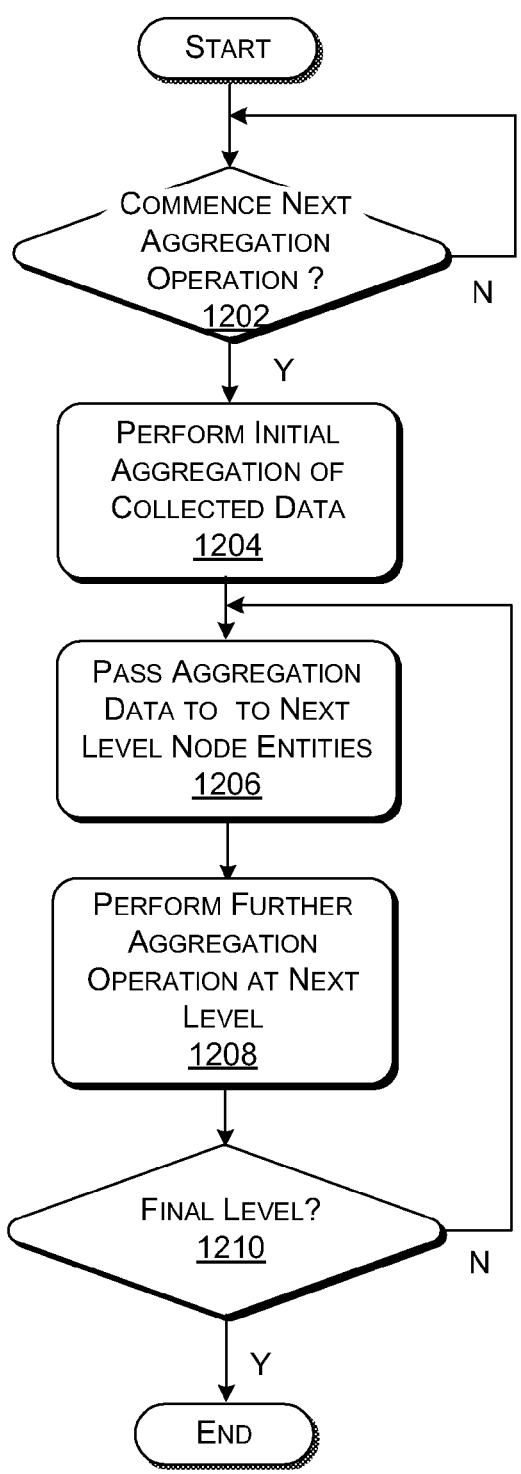
FIG. 12 is a flowchart that shows an illustrative way to provide aggregated data in one or more successive aggregation operations.

FIG. 12 shows an illustrative procedure 1200 which explains how aggregated results are passed up through the hierarchical tree 102. Block 1202 asks whether it is time to commence aggregation. For example, a leaf node entity may periodically perform an aggregation operation (e.g., at the end of every minute); in this context, block 1202 asks whether the interval has expired and it is time to perform the aggregation operation. Block 1204 involves performing an initial aggregation operation based on collected data. This operation can be performed at a leaf node entity or some other initial node entity. This operation yields initial aggregated data. Block 1206 entails passing the initial aggregated data to a leader node entity. Block 1208 entails performing a further aggregation operation at the next higher level in the hierarchical tree 102. Block 1210 entails repeating the operations in blocks 1206 and 1208 until the aggregated data percolates up to the root node entity 134 or other destination node entity.

FIG. 13 shows an illustrative procedure 1300 for requesting any kind of data from any node entity in the hierarchical tree 102, such as raw collected data and/or aggregated data. In block 1302, a requesting entity (such as the management module 142) requests the data. In block 1302, the requesting entity receives the requested data. FIG. 14 shows an illustrative procedure 1400 for providing requested data; this figure thus complements the operations shown in FIG. 13. In block 1402, an appropriate entity in the hierarchical tree 102 (such as a leaf node entity) receives the request for data. In block 1404, the appropriate entity supplies the requested data to the requesting entity. Alternatively, or in addition, the appropriate entity can use a push technique to independently supply data.

C. Representative Processing Functionality

FIG. 15 sets forth illustrative processing functionality 1500 that can be used to implement any aspect of functions described above. With reference to FIG. 1, for instance, the processing functionality 1500 can be used to implement any node entity (116-134), the management module 142, and so on. With reference to FIG. 2, the processing functionality 1500 can also be used to implement any of the electronic devices (202, 204, ... 206).

The processing functionality 1500 can include volatile and non-volatile memory, such as RAM 1502 and ROM 1504, as well as one or more processing devices 1506. The processing functionality 1500 also optionally includes various media devices 1508, such as a hard disk module, an optical disk module, and so forth. The processing functionality 1500 can perform various operations identified above when the processing device(s) 1506 executes instructions that are maintained by memory (e.g., RAM 1502, ROM 1504, or elsewhere). More generally, instructions and other information can be stored on any computer-readable medium 1510, including, but not limited to, static memory storage devices, magnetic storage devices, optical storage devices, and so on. The term computer-readable medium also encompasses plural storage devices. The term computer-readable medium also encompasses signals transmitted from a first location to a second location, e.g., via wire, cable, wireless transmission, etc.

The processing functionality 1500 also includes an input/output module 1512 for receiving various inputs from a user (via input modules 1514), and for providing various outputs to the user (via output modules). One particular output mechanism may include a presentation module 1516 and an associated graphical user interface (GUI) 1518. The processing functionality 1500 can also include one or more network interfaces 1520 for exchanging data with other devices via one or more communication conduits 1522. One or more communication buses 1524 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing data, comprising:
   passing policy information with node entity operation instructions from an initial node entity of a hierarchical tree of tree node entities to one or more target leaf node entities of the hierarchical tree, the passing comprising successively passing the policy information through a series of linked tree node entities of the hierarchical tree connecting the initial node entity to the one or more target leaf node entities;
   based at least in part on the node entity operation instructions, collecting data using the hierarchical tree from a plurality of data sources, to thereby provide collected data, the hierarchical tree including a plurality of levels including a leaf level, tree node entities in the leaf level of the hierarchical tree corresponding to leaf node entities, the leaf node entities including the one or more target leaf node entities;
   based at least in part on the node entity operation instructions, storing the collected data using storage resources provided by at least one portion of data processing equipment associated with the tree node entities of the hierarchical tree;

based at least in part on the node entity operation instructions, aggregating the collected data to form aggregated data using computing resources provided by one or both of: the at least one portion or at least one other portion of the data processing equipment associated with the tree node entities of the hierarchical tree, the storage resources and the computing resources together comprising distributed resources provided by the hierarchical tree; and based at least in part on the node entity operation instructions, selectively providing at least parts of the collected data and the aggregated data to a receiving entity.

2. The method of claim 1, wherein the collected data is made available to the receiving entity independently of the aggregated data.

3. The method of claim 1, wherein the collecting is performed using the leaf node entities.

4. The method of claim 1, wherein the collected data reflects performance of one or more devices associated with the leaf node entities and comprising one or more portions of the data processing equipment.

5. The method of claim 1, wherein the aggregating comprises performing successive aggregation operations at respective levels in the hierarchical tree,
wherein an initial aggregation operation performs aggregation directly on the collected data,
wherein each additional aggregation operation performs aggregation on aggregated data provided by an immediately preceding aggregation operation to yield further aggregated data,
wherein a final aggregation operation yields final aggregated data, and
wherein the receiving entity receives the final aggregated data from a representative of the plurality of tree node entities.

6. The method of claim 1, wherein the aggregating comprises at least one of: computing a sum of a group of collected data items; generating a count associated with the group of collected data items; finding a minimum value in the group of collected data items; or finding a maximum value in the group of collected data items.

7. The method of claim 1, wherein at least a subset of the tree node entities perform respective principal functions, and wherein the storage resources and computing resources of the hierarchical tree comprise spare resources that are not being utilized by the principal functions.

8. A computer-readable medium for storing computer-readable instructions, the computer-readable instructions providing an agent module when executed by one or more processing devices, the computer-readable instructions comprising:
collection module logic configured to provide collected data from at least one data source for storage in a data store; and
aggregation module logic configured to aggregate the collected data to form aggregated data,
the agent module being configured to selectively provide the collected data and the aggregated data to a receiving entity,
the agent module being provided on a production device, and the production device being a leaf member of a hierarchical tree of tree node entities; and
administrative module logic configured to receive information successively passed through the hierarchical tree, wherein the information provides rules governing use of resources of the production device by the agent module.

9. The computer-readable medium of claim 8, wherein the collected data reflects performance of the production device.

10. The computer-readable medium of claim 8, wherein the agent module is further configured to provide the aggregated data to a logically linked parent node entity of the hierarchical tree.

11. The computer-readable medium of claim 8, the computer-readable instructions further providing at least one other agent module when executed by one or more processing devices, the at least one other agent module being provided on the production device.

12. The computer-readable medium of claim 11, the production device being at least one other second leaf member of the hierarchical tree.

* * * * *